United States Patent
Cao et al.

(10) Patent No.: US 10,427,705 B2
(45) Date of Patent: Oct. 1, 2019

(54) STEERING WHEEL WITH FIXED ECCENTRIC CENTER HUB

(71) Applicant: GM GLOBAL TECHNOLOGY OPERATIONS LLC, Detroit, MI (US)

(72) Inventors: Yu Cao, Courtice (CN); Peter J. Judis, Rochester Hills, MI (US); Silviu A. Popescu, Ajax (CN); John T. Zuzelski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/638,447

(22) Filed: Jun. 30, 2017

(65) Prior Publication Data

US 2019/0002010 A1    Jan. 3, 2019

(51) Int. Cl.
*B62D 5/04* (2006.01)
*B62D 1/10* (2006.01)
*B62D 1/187* (2006.01)

(52) U.S. Cl.
CPC .............. *B62D 1/10* (2013.01); *B62D 1/187* (2013.01); *B62D 5/04* (2013.01); *B62D 5/0403* (2013.01); *B62D 5/0409* (2013.01); *B62D 5/0412* (2013.01); *B62D 5/0463* (2013.01)

(58) Field of Classification Search
CPC . B62D 1/10; B62D 1/187; B62D 5/04; B62D 5/0403; B62D 5/0409; B62D 5/0412; B62D 5/0463
USPC .................................................. 180/443, 444
See application file for complete search history.

(56) References Cited

U.S. PATENT DOCUMENTS

| 6,151,980 | A  * | 11/2000 | Nishitani  | B60Q 5/003 439/34 |
| 7,410,028 | B2 * | 8/2008 | Chikaraishi | B62D 5/006 180/402 |
| 2012/0024617 | A1* | 2/2012 | Markfort | B62D 1/10 180/444 |
| 2014/0000976 | A1* | 1/2014 | Markfort | B62D 1/10 180/444 |
| 2015/0197275 | A1* | 7/2015 | Ito | F16D 11/16 180/443 |
| 2015/0203147 | A1* | 7/2015 | Kuramochi | B62D 5/001 701/41 |
| 2017/0356544 | A1* | 12/2017 | Lee | F16H 61/0213 |
| 2018/0037248 | A1* | 2/2018 | Schwarz | B62D 1/04 |
| 2018/0086297 | A1* | 3/2018 | Bodtker | B60K 35/00 |

(Continued)

FOREIGN PATENT DOCUMENTS

| DE | 2919284 A1 | 11/1980 |
| DE | 102017108802 A1 | 11/2017 |
| WO | 2004080781 A1 | 9/2004 |

(Continued)

*Primary Examiner* — David H Bollinger
(74) *Attorney, Agent, or Firm* — Quinn IP Law (57) ABSTRACT

A steering system for an automotive vehicle is disclosed. The steering system includes a steering column assembly, a steering wheel assembly secured to the steering column assembly, the steering wheel assembly comprising a steering wheel frame, a steering wheel rim, and a hub, and an emulator enclosed within a housing, the emulator secured to the steering column assembly. The steering wheel frame and the hub are stationary and the steering wheel rim rotates relative to the steering wheel frame and the hub.

17 Claims, 5 Drawing Sheets

(56) References Cited

U.S. PATENT DOCUMENTS

2018/0362079 A1* 12/2018 Zuzelski ............... B62D 5/001

FOREIGN PATENT DOCUMENTS

| WO | 2009/072943 A1 | 6/2009 |
| WO | 2018049192 A1 | 3/2018 |

* cited by examiner

STEERING WHEEL WITH FIXED ECCENTRIC CENTER HUB

INTRODUCTION

The present invention relates generally to the field of vehicles and, more specifically, to steering wheels and steering columns for motor vehicles.

Steering columns for motor vehicles are often provided with mechanisms for adjusting the steering column's position by an operator of the motor vehicle. Available adjustments typically include a tilt or rake adjustment in which an angular position of the steering column is changed relative to the operator, and a telescoping adjustment in which the steering column is extended toward the operator or moved away from the operator.

For autonomously or semi-autonomously driven vehicles, a steering wheel that extends into the passenger compartment may be unnecessary and/or in the way of the passengers. Additionally, the position of the motor/emulator along the steering shaft, and the resulting gear reduction mechanism between the motor/emulator and the steering wheel, affects packaging and size requirements.

SUMMARY

Embodiments according to the present disclosure provide a number of advantages. For example, embodiments according to the present disclosure integrate a center-stationary steering wheel into a long, telescoping steering column such that when the steering wheel is stowed, the steering wheel fits into a hollow space in the dashboard, allowing the operator to view vehicle information while enabling better utilization of the space within the passenger compartment of the vehicle. The gear reduction mechanism between the steering wheel rim and motor/emulator reduces the size requirement of the motor/emulator, improving vehicle packaging space.

In one aspect, a steering system for an automotive vehicle includes a steering column assembly, a steering wheel assembly secured to the steering column assembly, the steering wheel assembly comprising a steering wheel frame, a steering wheel rim, and a hub, and an emulator enclosed within a housing, the emulator secured to the steering column assembly. The steering wheel frame and the hub are stationary and the steering wheel rim rotates relative to the steering wheel frame and the hub.

In some aspects, the emulator comprises a gear set configured to transfer torque from the emulator to the steering wheel rim.

In some aspects, the steering wheel assembly further includes a plurality of bearings positioned between the steering wheel rim and the steering wheel frame such that the steering wheel rim rotates relative to the steering wheel frame on the plurality of bearings.

In some aspects, the steering wheel frame is circular.

In some aspects, the steering wheel frame is oval.

In some aspects, the gear set includes at least a first gear coupled to the steering wheel rim and a second gear coupled to the emulator such that a reduction gear mechanism is applied between the emulator and the steering wheel rim.

In some aspects, the emulator is positioned adjacent to the steering wheel assembly.

In some aspects, the hub is eccentrically positioned relative to the steering wheel frame.

In another aspect, an automotive vehicle includes a plurality of vehicle wheels, a steering system including a steering column assembly, a steering wheel assembly secured to the steering column assembly, the steering wheel assembly including a steering wheel frame, a steering wheel rim, and a hub, and an emulator enclosed within a housing, the emulator coupled to the steering column assembly. The steering wheel frame and the hub are stationary and the steering wheel rim rotates relative to the steering wheel frame and the hub. The steering wheel assembly is positionable between a stowed position and an unstowed position. The steering system is connected to the vehicle wheels for steering the vehicle wheels.

In some aspects, the emulator includes a gear set configured to transfer torque from the emulator to the steering wheel rim.

In some aspects, the steering wheel assembly further includes a plurality of bearings positioned between the steering wheel rim and the steering wheel frame such that the steering wheel rim rotates relative to the steering wheel frame on the plurality of bearings.

In some aspects, the steering wheel frame is circular.

In some aspects, the steering wheel frame is oval.

In some aspects, the gear set includes at least a first gear coupled to the steering wheel rim and a second gear coupled to the emulator such that a reduction gear mechanism is applied between the emulator and the steering wheel rim.

In some aspects, the emulator is positioned adjacent to the steering wheel assembly.

In some aspects, the hub is eccentrically positioned relative to the steering wheel frame.

In some aspects, the automotive vehicle further includes an instrument panel including a groove, wherein the steering wheel assembly fits within the groove when the steering wheel assembly is in the stowed position.

In some aspects, the steering wheel rim does not rotate relative to the steering wheel frame when the steering wheel assembly is in the stowed position.

In some aspects, the instrument panel further includes an instrument display, and wherein the steering wheel frame at least partially surrounds the instrument display when the steering wheel assembly is in the stowed position.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

In the execution of steer-by-wire technology, steering feel emulators provide torque feedback to the driver to compensate for the lack of mechanical connection between the steering wheel and the road wheels. Embodiments discussed herein integrate a center-stationary steering wheel into a telescoping steering column for use by a steer-by-wire and/or autonomous or semi-autonomous vehicle. The steering wheel having a fixed eccentric hub can be stowed within the instrument panel dashboard when not in use to increase the amount of usable space within the passenger compartment while also allowing the operator to easily review vehicle information displayed on the instrument panel.

In some embodiments, a steering emulator is located directly behind the steering wheel, reducing space and packaging costs. Furthermore, the gear reduction mechanism between the emulator and steering wheel reduces the emulator torque requirement as compared to a direct drive emulator, allowing for a smaller motor/emulator size with associated savings in power and packaging costs.

Figure 1:
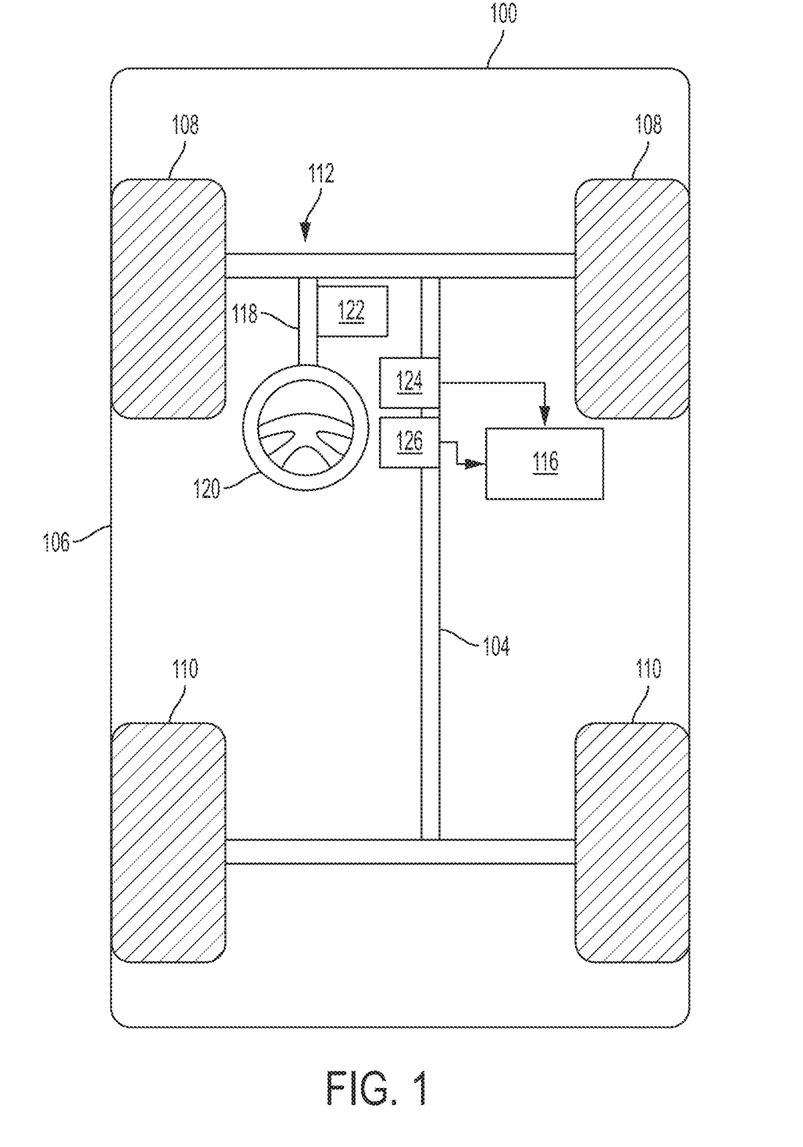
FIG. 1 is a schematic illustration of a vehicle having a steering system, according to an embodiment.

With reference to FIG. 1, a vehicle 100 is shown that includes a steering system 112 in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 100 generally includes a chassis 104, a body 106, front wheels 108, rear wheels 110, a steering system 112, and a control system 116. The body 106 is arranged on the chassis 104 and substantially encloses the other components of the vehicle 100. The body 106 and the chassis 104 may jointly form a frame. The wheels 108-110 are each rotationally coupled to the chassis 104 near a respective corner of the body 106.

As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In some embodiments, the steering system 112 includes a steering column assembly 118 and a steering wheel assembly 120. In various embodiments, the steering system 112 is a steer-by-wire system that makes use of electric motors to provide steering assist, sensors to measure steering wheel angle and torque applied by the operator, and a steering wheel emulator to provide torque feedback to the driver.

In various embodiments, the steering system 112 includes a motor 122 that is coupled to the steering system 112, and that provides force to the road wheels 108. The motor 122 can be coupled to the rotatable shaft of the steering column assembly 118. The steering system 112 further includes one or more sensors that sense observable conditions of the steering system 112. In various embodiments, the steering system 112 includes a torque sensor 124 and a steering angle sensor 126. The torque sensor 124 senses a rotational torque applied to the steering system by for example, a driver of the vehicle 100 via the steering wheel assembly 120 and generates torque signals based thereon. The steering angle sensor 126 senses a rotational position of the steering wheel 120 and generates position signals based thereon.

The control system 116 receives the sensor signals and monitors operation of the steering system 112 based thereon. In general, the control system 116 receives the torque sensor signals, and processes the torque sensor signals over a certain time period to determine the force to apply to the road wheels. In some embodiments, the control system 116 is coupled to the steering column assembly 118.

FIGS. 2-10 illustrate a fixed eccentric hub steering system 212, according to several embodiments. The steering system 212 includes a steering column assembly 218 and a steering wheel assembly 220. In some embodiments, the steering wheel assembly 220 includes a steering wheel frame 242, a steering wheel rim 244, and a steering wheel hub 246. In some embodiments, the steering wheel frame 242 is an interior, stationary frame that does not rotate with the steering wheel rim 244. In some embodiments, the steering wheel rim 244 rotates relative to the steering wheel frame 242. In some embodiments, the hub 246 is stationary and does not rotate. The steering wheel frame 242, the steering wheel rim 244, and the hub 246 are discussed in greater detail herein.

Figure 2:
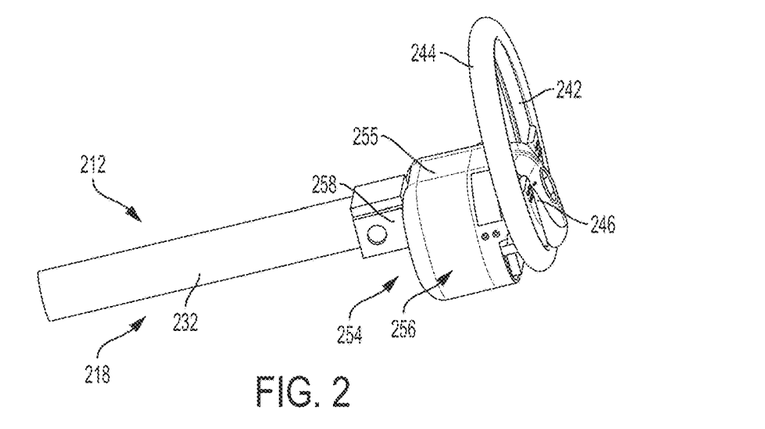
FIG. 2 is a schematic side perspective view of a steering system, according to an embodiment.

In some embodiments, a motor/emulator 254 is mounted directly behind the steering wheel assembly 220. In some embodiments, the motor/emulator 254 is coupled anywhere along the rotatable shaft of the steering column assembly 218. The motor/emulator 254 includes a housing 255 having an outside surface 256 and a tilt connection portion 258. The tilt connection portion 258 connects at a tilt pivot point 260 to the steering column assembly 218 to allow the operator to tilt the steering wheel assembly 220 to a desired angle. In some embodiments, the housing 255 of the motor/emulator 254 houses a reduction gear mechanism configured to reduce the emulator torque requirement.

Figure 3:
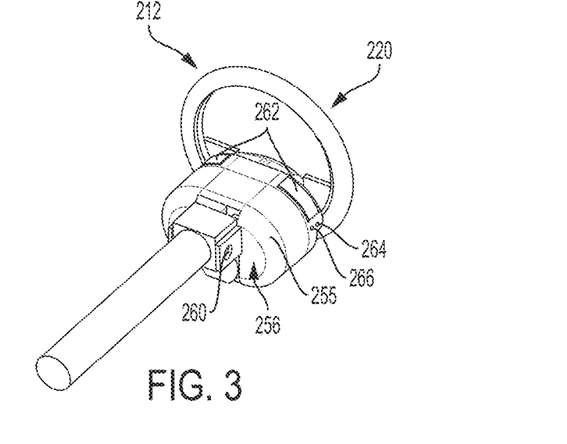
FIG. 3 is a schematic rear perspective view of the steering system with non-traditional switch driver controls of FIG. 1.

In some embodiments, as shown in FIG. 3, the outside surface 256 of the emulator housing 255 includes a plurality of touch-sensitive driver controls 262 integrated into the housing. In some embodiments, the controls are displayed on a heads-up display (HUD) to the operator. The touch sensitive driver controls 262 allow the operator to conveniently control various functions such as, for example and without limitation, turn signals and windshield wash fluid and wipers with one or more fingers as the steering wheel rim 244 rotates. In some embodiments, additional touch sensitive controls 264, 266 can be located on a side of the housing 255 or on any other location on the steering wheel assembly 220 to allow the operator to stow the steering wheel assembly 220 within the instrument panel, as discussed herein, and/or to tilt the steering wheel assembly 220 about the tilt pivot point 260 to a desired tilt angle.

Figure 4:
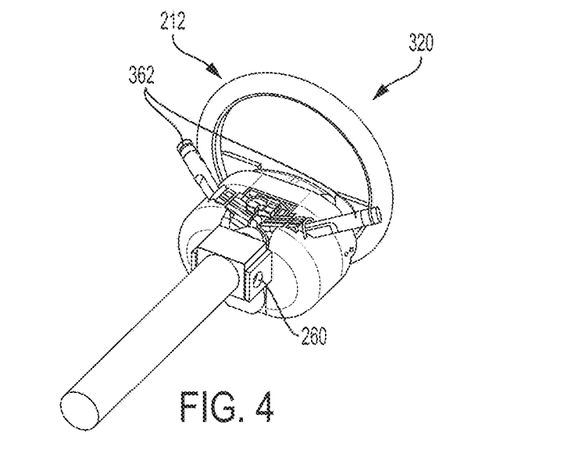
FIG. 4 is a schematic rear perspective view of a steering system with traditional switch driver controls, according to an embodiment.

In some embodiments, as shown in FIG. 4, the emulator 224 includes a plurality of driver switch controls 362. The driver switch controls 362 allow the operator to control various functions such as, for example and without limitation, turn signals and windshield wash fluid and wipers using a lever operation as is known.

Figure 5:
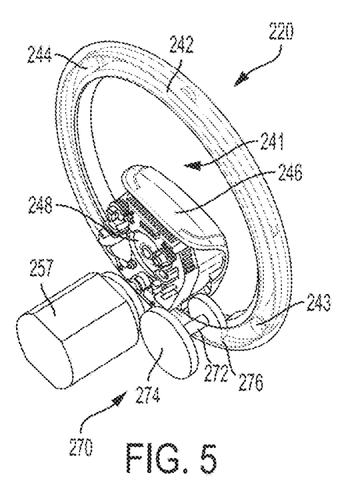
FIG. 5 is a schematic rear perspective view of a steering wheel assembly, according to an embodiment.

The steering wheel assembly 220 is shown in greater detail in FIG. 5. The stationary steering wheel frame 242 supports the fixed hub 246. The steering wheel frame 242 and hub 246 are supported by the steering column assembly 218 but do not rotate with the steering wheel rim 244. In some embodiments, the steering wheel frame 242 and hub 246 are connected together underneath the hub 246. In some embodiments, the steering wheel frame 242 and hub 246 are attached to the housing 255 of the motor/emulator 254.

In some embodiments, the frame 242 defines a substantially circular opening 241. In other embodiments, the frame 242 defines other opening shapes, such as oval. The hub 246 is eccentrically and not centrally located within the opening 241 defined by the steering wheel frame 242, that is, a longitudinal axis passing through the hub 246 is parallel to a longitudinal axis passing through the center of the opening 241. The hub 246 houses a supplemental restraint system, such as an air bag module, for deployment in the event of a vehicle impact. Because the hub 246 is stationary, that is, the hub 246 does not rotate with the steering wheel, the air bag module remains in the same orientation relative to the cabin of the vehicle 100 when it is activated. Locating the hub 246 offset from the axis of the steering wheel frame 244

The rim 244 is a rotatable surface at least partially covering the frame 242. In some embodiments, the rim 244 is a flexible material covering at least a portion of the frame 242. In some embodiments, the rim 244 is a rigid material covering at least a portion of the frame 242. In some embodiments, the steering wheel assembly 220 includes a plurality of bearings 243 disposed between the frame 242 and the rim 244. The bearings 243 allow the rim 244 to rotate smoothly over the outer surface of the frame 242.

In some embodiments, a gear set 270 is coupled with the rim 244 and with an output shaft of the motor 257 of the emulator 254. In some embodiments, the gear set 270 is an inside engaged gear set. The gear set 270 consists of a common shaft 272 with two gears 274, 276 attached to the ends of the shaft 272. Teeth on an outer edge of the gear 276 mesh with internal gear teeth on the steering wheel rim 244. Emulator torque feedback can be transferred to the steering wheel rim through the gear set 270. Teeth on an outer edge of the gear 274 mesh with an output shaft of the motor 257.

The reduction gear mechanism of gear set 270 between the emulator 254 and the steering wheel rim 244 allows for a decreased emulator torque requirement. The decreased emulator torque requirement further results in a smaller emulator size, both in packaging size and power output, providing additional benefits in cost and mass savings.

The emulator 254 receives steering information from the operator via the rim 244 and the gear set 270 and provides torque feedback to the operator via the gear set 270 and the rim 244 to provide a steering feel for the steer-by-wire vehicle 100. The gear ratio between the motor 257 and the rotatable steering wheel rim 244 reduces the emulator torque requirement as compared with a direct drive emulator. The decreased torque requirement reduces the size of the motor/emulator 254 for improved packaging options.

Figure 6:
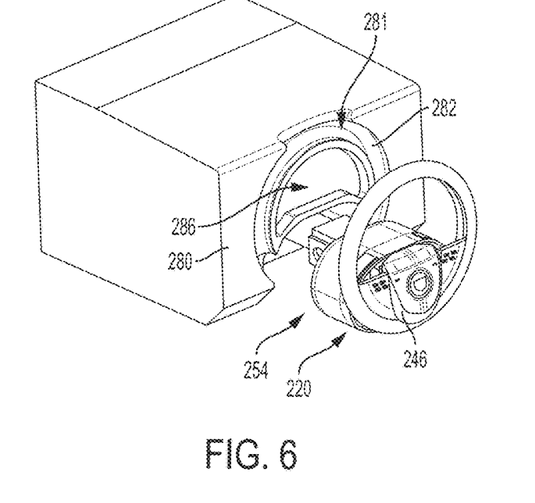
FIG. 6 is a schematic front perspective view of a vehicle dashboard and a steering wheel assembly with non-traditional switch driver controls in an unstowed configuration, according to an embodiment.
Figure 7:
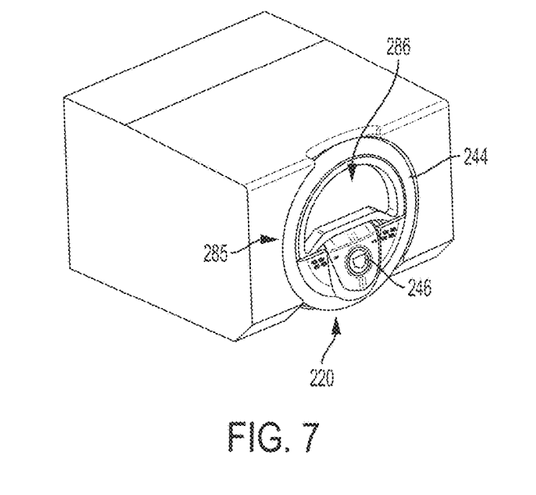
FIG. 7 is a schematic front perspective view of the vehicle dashboard and the steering wheel assembly with non-traditional switch driver controls of FIG. 6 illustrating the steering wheel assembly in a stowed configuration, according to an embodiment.

With reference to FIGS. 6 and 7, when the steering column is stowed, the steering wheel assembly 220 fits into a dedicated hollow space in the dashboard. FIG. 6 illustrates the steering wheel assembly 220 in an unstowed configuration. As discussed herein, the motor/emulator 254 is directly behind the steering wheel assembly 220 rather than separated from the steering wheel assembly 220 by the steering column. In some embodiments, the dashboard 280 of the vehicle 100 includes a hollowed out groove 281. The groove 281 is configured to receive the frame 242, rim 244, and hub 246 of the steering wheel assembly 220. In some embodiments, the groove 281 is defined by a curved surface 282 that is open to the cabin of the vehicle 100 to receive the steering wheel assembly 220 when a command to stow the assembly 220 is received. At least a portion of the groove 281 is configured to receive the frame 242 and rim 244 of the assembly 220 while a lower portion of the groove 281 is configured to receive the motor/emulator 254 and the hub 246.

FIG. 6 illustrates the steering wheel assembly 220 in a stowed configuration. In some embodiments, when the steering wheel assembly 220 and motor/emulator 254 are stowed within the groove 281 in the dashboard 280, the steering assembly 220 is substantially flush with an exterior surface 285 of the dashboard 280. The smaller size of the emulator 254 reduces the amount of space within the dashboard 280 that is needed to receive the emulator 254 when the steering assembly 220 is in the stowed position, reducing cost. Since the hub 246 is eccentrically located on the steering wheel frame 242, an instrument cluster opening 286 is visible both when the steering assembly 220 is in the stowed position and when it is in the unstowed position. In some embodiments, the instrument cluster opening includes a display that electronically display vehicle information including for example and without limitation, a vehicle speed, an engine oil temperature, and a vehicle fuel level.

When the steering wheel assembly 220 is in the stowed position, the steering wheel rim 244 does not rotate. Furthermore, in some embodiments, such as those shown in FIGS. 2-7, the steering wheel assembly 220 does not include spokes that can be used by the operator to identify the road wheel angle. In some embodiments, markings on the cluster or on the rim can help the operator identify the position of the road wheel angle (that is, whether the tires of the vehicle are oriented in a straight direction or otherwise positioned).

In some embodiments, due to the symmetric shape of the steering wheel frame and a lack of spokes, the steering wheel and the road wheel angle can be easily synchronized when the steering wheel rim is at any point of rotation about the steering wheel frame.

Figure 8:
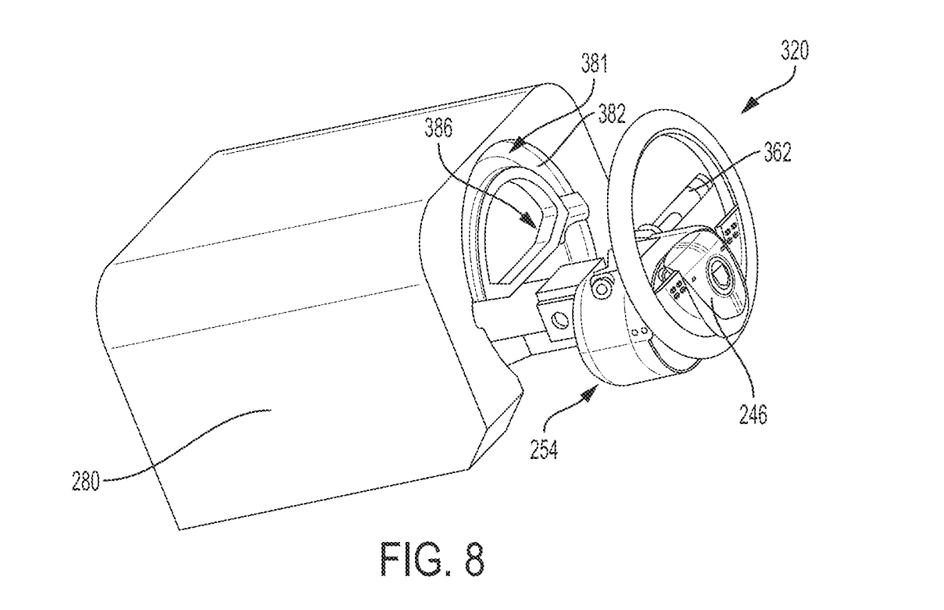
FIG. 8 is a schematic front perspective view of a vehicle dashboard and a steering wheel assembly with traditional switch driver controls, illustrating the steering wheel assembly in an unstowed configuration, according to an embodiment.
Figure 9:
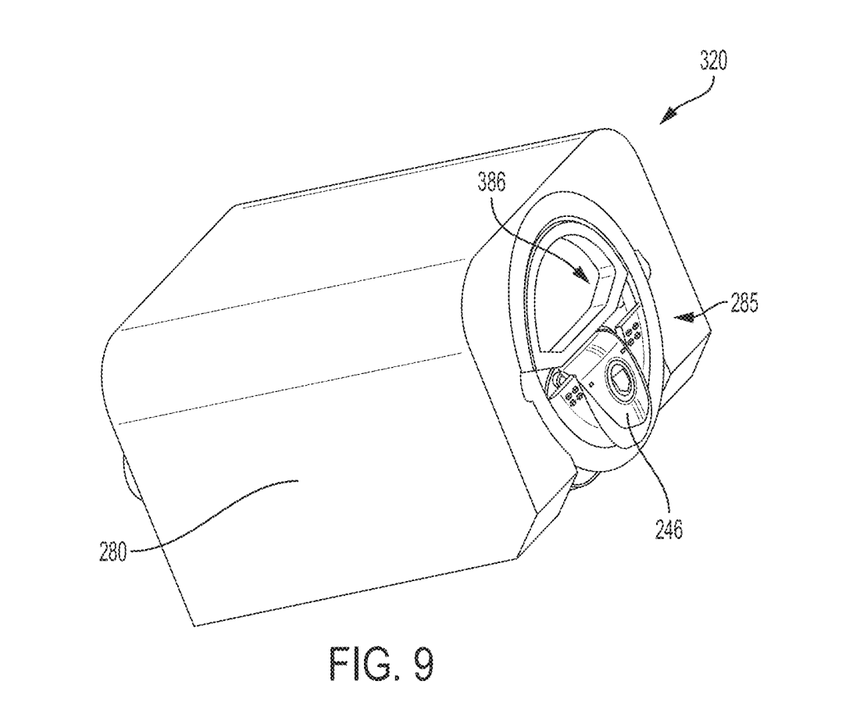
FIG. 9 is a schematic front perspective view of the vehicle dashboard and the steering wheel assembly with traditional switch driver controls, of FIG. 8 illustrating the steering wheel assembly in a stowed configuration, according to an embodiment.

FIGS. 8-9 illustrate the steering wheel assembly 320, shown in FIG. 4, in both an unstowed and a stowed configuration. FIG. 8 illustrates the steering wheel assembly 320 in an unstowed position. In some embodiments, the dashboard 280 of the vehicle 100 includes a hollowed out groove 381. The groove 381 is configured to receive the frame 342, rim 344, one or more driver switch controls 362, and hub 246 of the steering wheel assembly 320. In some embodiments, the groove 381 is defined by a curved surface 382 that is open to the cabin of the vehicle 100 to receive the steering wheel assembly 320 when a command to stow the assembly 320 is received. At least a portion of the groove 381 is configured to receive the frame 342, rim 344, and one or more driver switch controls 362 of the assembly 320 while a lower portion of the groove 381 is configured to receive the motor/emulator 254 and the hub 246.

FIG. 9 illustrates the steering wheel assembly 320 in a stowed configuration. In some embodiments, when the steering wheel assembly 320 and motor/emulator 254 are stowed within the groove 381 in the dashboard 280, the steering assembly 320 is substantially flush with an exterior surface 285 of the dashboard 280. The smaller size of the emulator 254 reduces the amount of space within the dashboard 280 that is needed to receive the emulator 254 when the steering assembly 320 is in the stowed position, reducing cost. Since the hub 246 is eccentrically located on the steering wheel frame 342, an instrument cluster opening 286 is visible both when the steering assembly 320 is in the stowed position and when it is in the unstowed position. In some embodiments, the instrument cluster opening includes a display that electronically display vehicle information including for example and without limitation, a vehicle speed, an engine oil temperature, and a vehicle fuel level.

Figure 10:
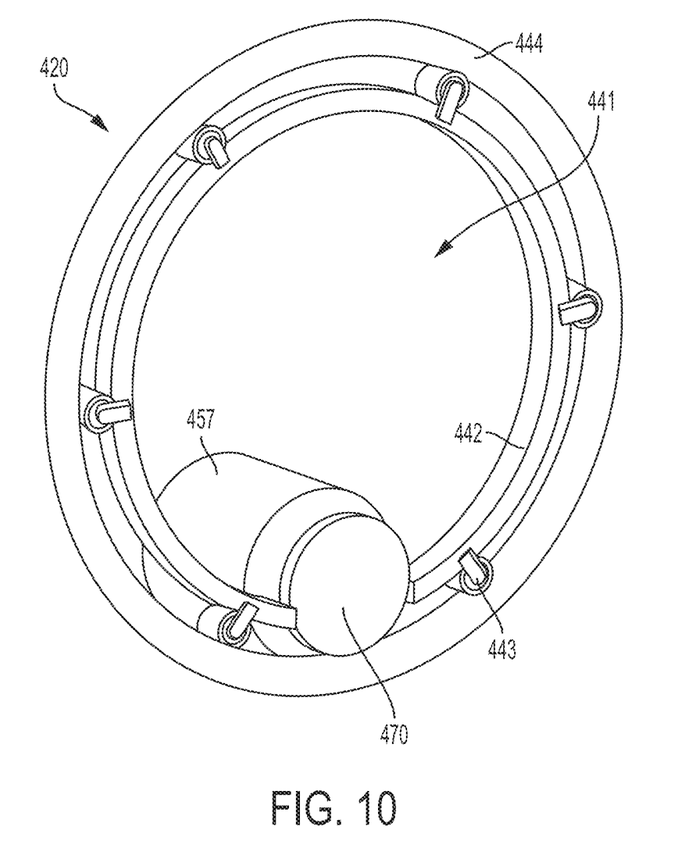
FIG. 10 is a schematic illustration of a steering wheel assembly, according to an embodiment.

FIG. 10 illustrates another embodiment of a steering wheel assembly 420. Similar to the steering wheel assembly 220 shown in FIG. 5, the steering wheel assembly 420 includes a stationary steering wheel frame 442 that supports an eccentrically mounted fixed hub (not shown). The steering wheel frame 442 and the hub are supported by the steering column assembly but do not rotate with the steering wheel rim 444.

In some embodiments, the frame 442 defines a substantially circular opening 441. In other embodiments, the opening 441 can be other shapes, such as oval. As discussed herein, the hub, such as the hub 246, is eccentrically located within the opening 441, that is, an axis passing longitudinally through the hub 246 is parallel to the longitudinal axis of the opening 441.

The rim 444 is a rotatable surface at least partially covering the frame 442. In some embodiments, the rim 444 is a flexible material covering at least a portion of the frame 442. In some embodiments, the rim 444 is a rigid material covering at least a portion of the frame 442. In some embodiments, the steering wheel assembly 420 includes a plurality of bearings 443 disposed between the frame 442 and the rim 444. The bearings 443 allow the rim 444 to rotate smoothly over the outer surface of the frame 442.

In some embodiments, a gear set 470 is coupled with the rim 444 and with a motor 457 of the emulator. In some embodiments, the gear set 470 is an inside engaged gear set, as discussed herein with respect to FIG. 5. The gear set 470 consists of an inside engaged gear attached to the steering wheel rim 444 and an outside engaged gear attached to the emulator output shaft. External gear teeth on the emulator output shaft mesh with internal gear teeth on the steering wheel rim 444. Emulator torque feedback can be transferred to the steering wheel rim 444 through the gear set 470.

It should be emphasized that many variations and modifications may be made to the herein-described embodiments the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way, required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A steering system for an automotive vehicle, comprising:
   a steering column assembly;
   a steering wheel assembly secured to the steering column assembly, the steering wheel assembly comprising a steering wheel frame, a steering wheel rim, and a hub; and
   an emulator coupled to the steering column assembly and providing steering torque feedback via the steering wheel assembly, the emulator comprising a motor enclosed within a housing, the motor secured to the steering column assembly;
   wherein the steering wheel frame and the hub are stationary and the steering wheel rim rotates relative to the steering wheel frame and the hub.

2. The steering system of claim 1, wherein the emulator further comprises a gear set enclosed within the housing, the gear set comprising a shaft having a first gear at a first end of the shaft and a second gear at a second end of the shaft, the first gear configured to engage with the steering wheel rim and the second gear configured to engage with the motor of the emulator such that the gear set transfers torque from the emulator to the steering wheel rim.

3. The steering system of claim 1, wherein the steering wheel assembly further comprises a plurality of bearings positioned between the steering wheel rim and the steering wheel frame such that the steering wheel rim rotates relative to the steering wheel frame on the plurality of bearings.

4. The steering system of claim 1, wherein the steering wheel frame is circular.

5. The steering system of claim 1, wherein the steering wheel frame is oval.

6. The steering system of claim 1, wherein the emulator is positioned adjacent to the steering wheel assembly.

7. The steering system of claim 1, wherein the hub is eccentrically positioned relative to the steering wheel frame.

8. An automotive vehicle, comprising:
   a plurality of vehicle wheels;
   a steering system comprising
      a steering column assembly;
      a steering wheel assembly secured to the steering column assembly, the steering wheel assembly comprising a steering wheel frame, a steering wheel rim, and a hub; and
      an emulator providing steering torque feedback via the steering wheel assembly, the emulator comprising a motor enclosed within a housing, the motor coupled to the steering column assembly;
   wherein the steering wheel frame and the hub are stationary and the steering wheel rim rotates relative to the steering wheel frame and the hub;
   wherein the steering wheel assembly is positionable between a stowed position and an unstowed position; and
   wherein the steering system is connected to the vehicle wheels for steering the vehicle wheels.

9. The automotive vehicle of claim 8, wherein the emulator further comprises a gear set enclosed within the housing, the gear set comprising a shaft having a first gear at a first end of the shaft and a second gear at a second end of the shaft, the first gear configured to engage with the steering wheel rim and the second gear configured to engage with the motor of the emulator such that the gear set transfers torque from the emulator to the steering wheel rim.

10. The automotive vehicle of claim 8, wherein the steering wheel assembly further comprises a plurality of bearings positioned between the steering wheel rim and the steering wheel frame such that the steering wheel rim rotates relative to the steering wheel frame on the plurality of bearings.

11. The automotive vehicle of claim 8, wherein the steering wheel frame is circular.

12. The automotive vehicle of claim 8, wherein the steering wheel frame is oval.

13. The automotive vehicle of claim 8, wherein the emulator is positioned adjacent to the steering wheel assembly.

14. The automotive vehicle of claim 8, wherein the hub is eccentrically positioned relative to the steering wheel frame.

15. The automotive vehicle of claim 8, further comprising an instrument panel comprising a groove, wherein the steering wheel assembly fits within the groove when the steering wheel assembly is in the stowed position.

16. The automotive vehicle of claim 15, wherein the steering wheel rim does not rotate relative to the steering wheel frame when the steering wheel assembly is in the stowed position.

17. The automotive vehicle of claim 15, wherein the instrument panel further comprises an instrument display, and wherein the steering wheel frame at least partially surrounds the instrument display when the steering wheel assembly is in the stowed position.

\* \* \* \* \*